June 21, 1955   J. A. ARMSTRONG ET AL   2,711,225
HIGH EFFICIENCY HIGH VELOCITY ELECTROSTATIC AIR CLEANER
Filed Oct. 8, 1953   4 Sheets-Sheet 3

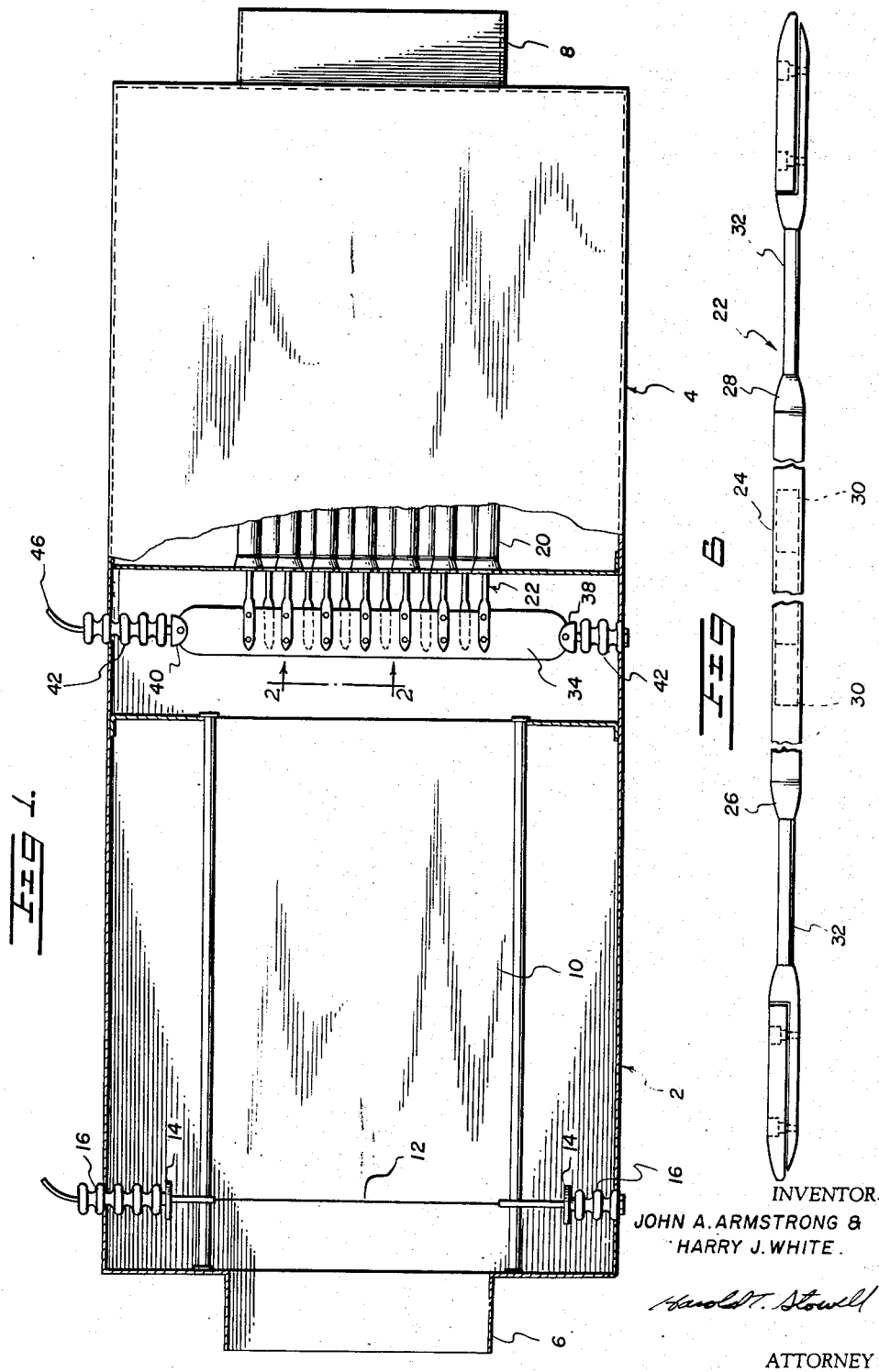

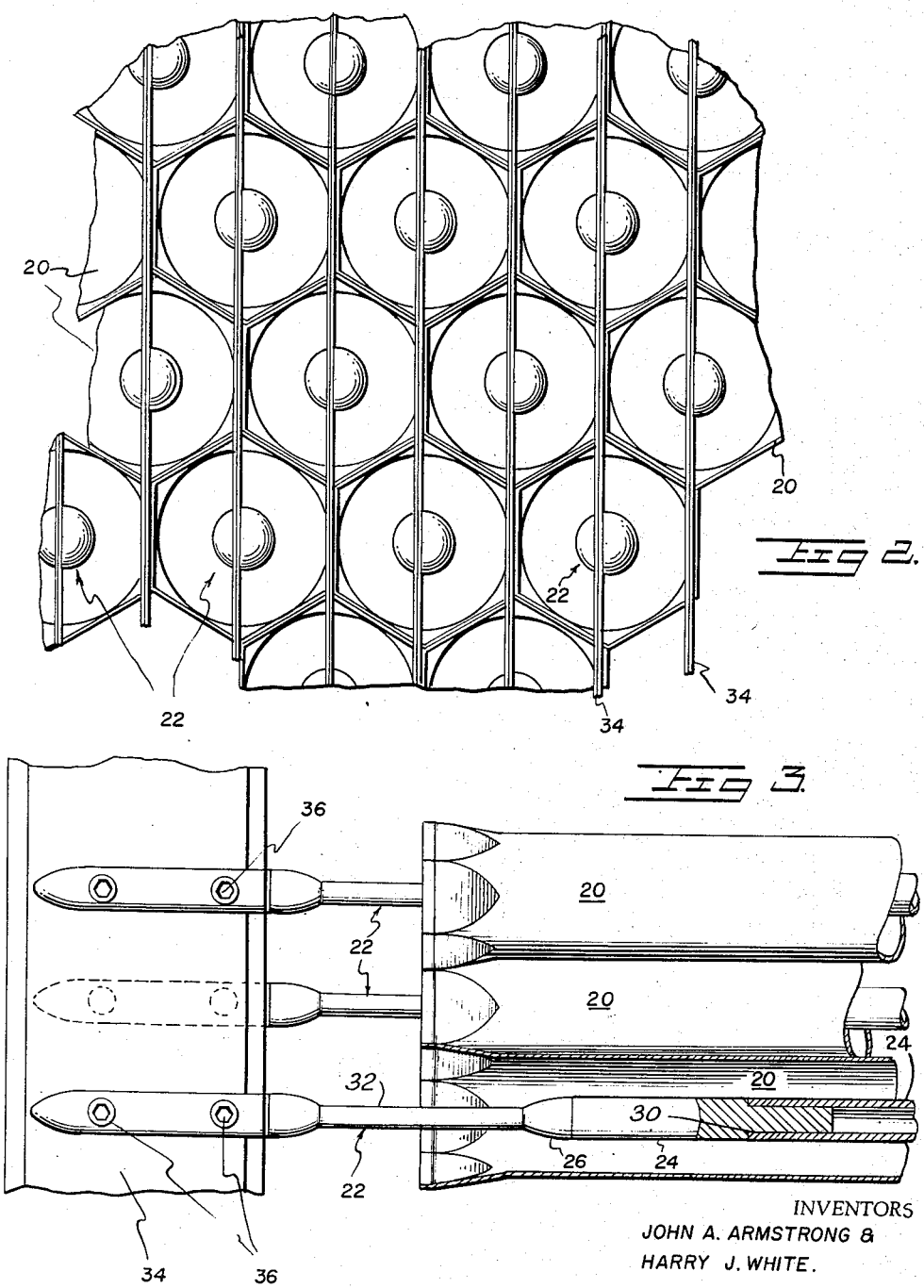

INVENTORS
JOHN A. ARMSTRONG &
HARRY J. WHITE.

BY *Harold T. Stowell*

ATTORNEY

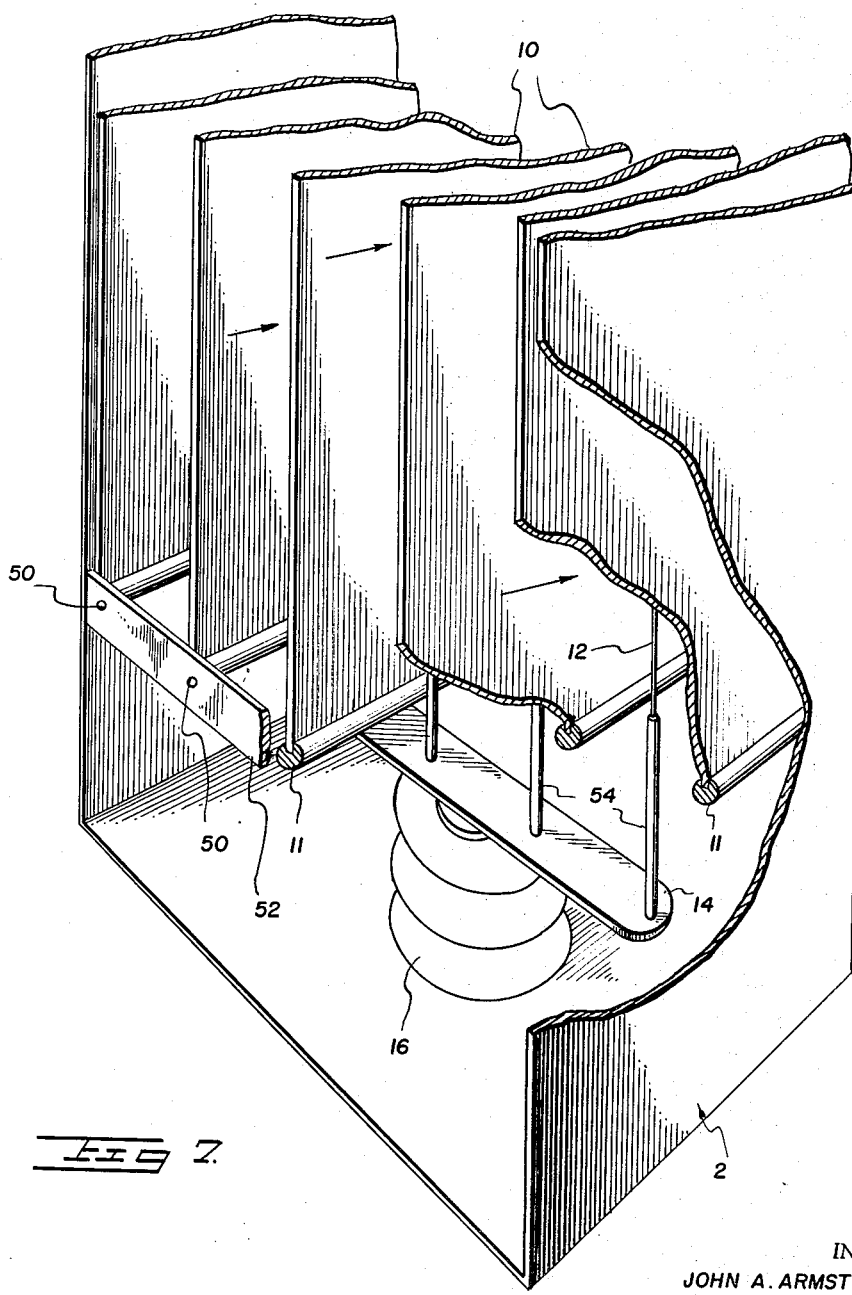

United States Patent Office 2,711,225
Patented June 21, 1955

2,711,225

HIGH EFFICIENCY HIGH VELOCITY ELECTROSTATIC AIR CLEANER

John Ayres Armstrong, Plainfield, and Harry J. White, Basking Ridge, N. J., assignors to Research Corporation, New York, N. Y., a corporation of New York Application October 8, 1953, Serial No. 384,828

10 Claims. (Cl. 183—7)

This invention relates to an electrostatic precipitation device and more specifically to a high efficiency, high velocity electrostatic air cleaner.

In the cleaning and purification of air travelling at high velocity in a duct, it is known to utilize an electrostatic precipitator having two sections, namely a charging section and a collecting section. The charging section is provided with charging and collecting electrodes and is intended primarily to charge the particles which are to be removed, while the collecting section is provided with nondischarge electrodes to establish an electrostatic field which causes precipitation of the charged particles upon the collecting electrodes of this section with a minimum of ozone-producing discharge, which is highly undesirable in an air cleaning system. In such systems, the desirable characteristics include high efficiency, minimum interference with air flow, and as compact an apparatus as possible. It is a primary object of this invention to provide all of these characteristics to an outstanding degree. More specifically, it is an object of the invention to provide a compact electrostatic air cleaner having electrode elements and supports therefor which are streamlined in the direction of gas flow, so as to provide a minimum reduction in pressure due to such interference with gas flow. A further object is the provision of structurally rigid members of sturdy and rugged construction, which nevertheless have a very small cross-sectional area in the direction of gas flow, and are capable of withstanding a considerable amount of shock and vibration, such as these equipments are often subjected to.

The specific nature of the invention, as well as other objects and advantages thereof, will clearly appear from a description of a preferred embodiment as shown in the accompanying drawing in which:

Fig. 1 is a side elevation, partly broken away, of a two-section precipitator embodying the invention;

Fig. 2 is a sectional view taken on line 2—2 of Fig. 1 showing a portion of the collector section of the precipitator;

Fig. 3 is a side view of Fig. 2;

Fig. 6 is a top view of a non-discharging precipitating electrode, and

Fig. 7 is a perspective view of the front end of the charging section of the precipitator, showing details of construction.

Figure 4:
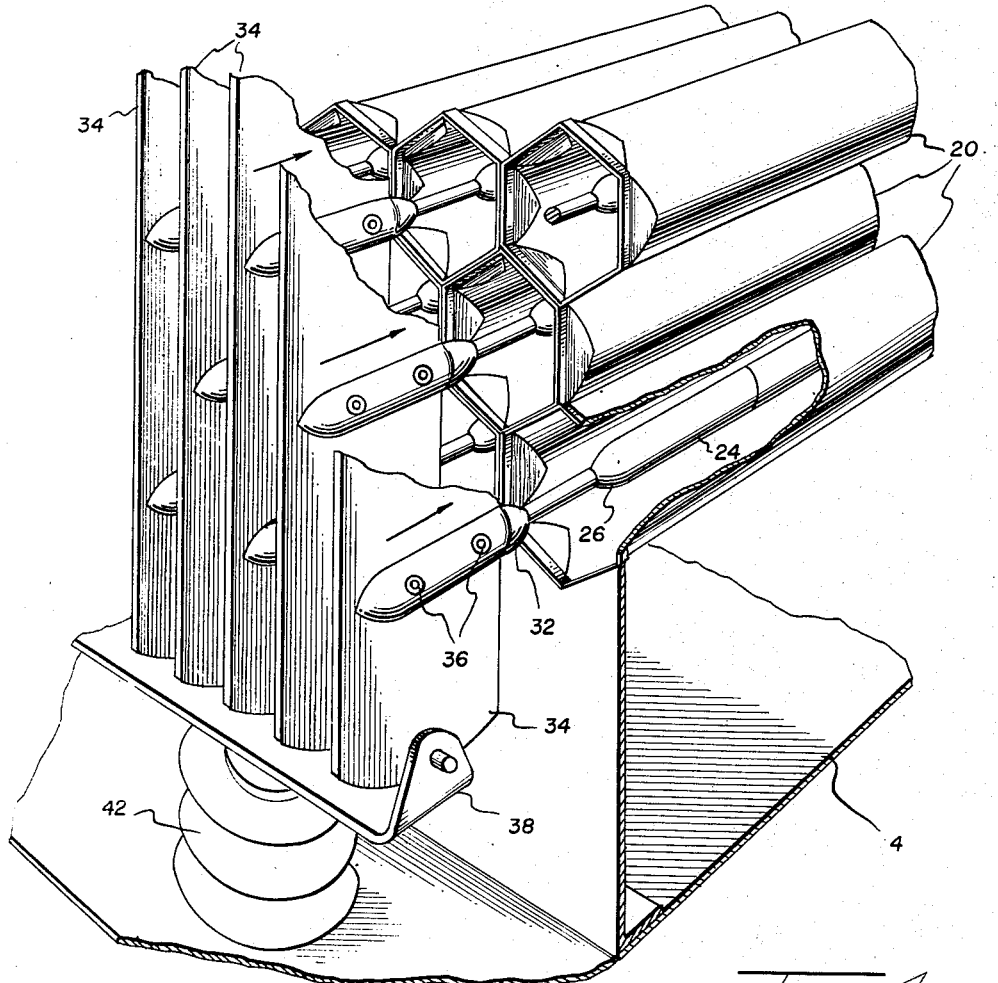
Fig. 4 is a perspective view of a portion of one end of the collector section of the precipitator, showing details of construction.
Figure 5:
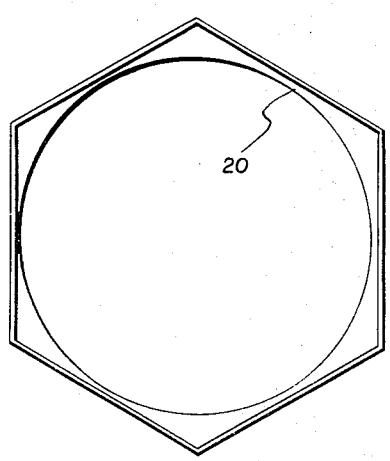
Fig. 5 is an end view of a single collector electrode.

Referring to Fig. 1, the precipitator is shown to consist of a charging section 2 and a collecting section 4. The charging section is provided with a suitable flange 6 for connection with a duct providing the incoming air to be cleaned; and the collecting section is similarly provided with a flange 8 for connection with a duct for leading away the cleaned outgoing gas. The charging section comprises a plurality of plates 10 which are grounded to the frame and provide the collecting electrodes. Between the plates 10 are provided discharge electrodes 12 which may consist of wires in the order of 5 or 10 mils or thin straight or twisted conductive strips suitably supported on horizontal supports 14, which are insulated from the duct by means of high voltage insulators 16. As the edges of collector electrode plates 10 are presented to the gas stream, it will be seen that a minimum of interference with gas flow is provided by this construction.

Immediately adjacent to the charging section 2 is the precipitating section 4. This section is divided into a number of parallel gas flow paths by tubular collecting electrodes 20 (see Fig. 4), which are shown as round tubes the ends of which are flared to provide hexagonal configurations which may be conveniently nested together as best shown in Figs. 2 and 4. The adjacent edges of the hexagons are smoothly joined, as by welding or soldering, to provide relatively sharp edges. Due to these edges and the gradual flaring of the ends, a minimum obstruction is provided to gas flow.

Centrally disposed in each collecting electrode is a non-discharge precipitating electrode 22, preferably formed as best shown in Fig. 6, with a tubular central section 24 and two end sections 26 and 28 which may be conveniently and firmly attached to tubular sections by a pressed fit as indicated at 30. Each end section has a reduced portion as shown in 32. This reduced section is opposite the flared end of the respective collecting tubes, and thereby provide a maximum of spacing between the precipitating electrode and the collecting electrode precisely at the end portion, where the greatest tendency to sparking may occur because of the necessarily sharp discontinuity at the end of the collecting electrode. At the same time, since the reduced portion 32 is preferably made solid and in any case is made strong and rigid, it is adequate to support and maintain the central electrode in correct position and alignment against all of the forces to which it may be subjected in ordinary service. For this purpose, the end portion of each central electrode 22 is firmly and rigidly fastened to a supporting member 34 to provide a cantilever end support for the inner electrodes. The fastening means may typically consist of screw members 36, there being at least two for each electrode end, in order to insure that a cantilever support will be provided. However, it is apparent that any suitable fastening means may be employed. It will also be apparent that the central section 24 may be solid instead of tubular and that the electrodes need not be circular in cross-section, but both collecting and precipitating electrodes may be of other shapes. The configuration and spacing should however be such as to provide non-discharge action.

Vertical supporting members 34 are in turn mounted between a lower beam 38 and an upper beam 40 arranged to support between them all of the vertical supporting members 34. The beams in turn are supported and insulated by means of high-voltage insulators 42. High voltage may be supplied to the upper beam 40 from any suitable source by means of conductor 46.

The arrangement shown in Fig. 4 is for the up-stream end of the collecting section. It will be apparent that a similar supporting structure is provided at the downstream end. Referring to Fig. 7, the charging section is divided into a number of ducts by vertical collecting plate electrodes 10. At the top and bottom of each plate 10 a rounded bead portion 11 is provided to serve as a corona guard. These thickened bead portions 11 also conveniently serve to hold fastening means 50 such as screws or rivets for fastening plates 10 to transverse bar 52 whereby the plates are firmly held and properly spaced. There are, of course, four such bars 52, one for each corner of the plates 10, and the bars are suitably fastened, as by welding, to the side walls of the cleaner.

A single charging electrode 12 is provided in the forward end of each duct. Each electrode 12 has a thickened shroud portion 54 extending a distance from its top and bottom so that opposite the corona guards or beads on the plate electrodes a more rounded surface is presented by each electrode 12 than in the central portion, to minimize corona. The central portion of each charging electrode 12 would ordinarily be of 5 or 10 mil wire to provide an effective charging action as is well understood in the art. While only a single charging electrode has been shown at the forward end of each duct, two or more such electrodes may be employed without substantially effecting the low ozone qualities of the device and the electrodes need not necessarily be at the forward end of the ducts. It is thus apparent that a compact and efficient structure is provided, with a minimum of obstruction to airflow and a maximum compactness and efficiency. An important feature of the design is the achievement of smooth gas flow conditions at high gas velocities, particularly in the collecting section, which was formerly very difficult to achieve. It has been found that even a small amount of turbulence or eddying will cause a large decrease in collecting efficiency when the unit is operated at high gas velocities. This situation is inherent in all precipitators and can only be overcome by proper design which eliminates turbulence and eddying. For example, the substitution of small round supporting members for knife-blade members 34 disturbed the gas flow sufficiently to reduce efficiency from 99.8% to 95% at a gas velocity of about 35 feet per second. This corresponds to increasing the loss by a factor of 25. It will be noted that the above construction requires no header plates with their inherent losses and costly manufacture. The end members of the inner electrodes act as cantilevers in the construction shown, which reduces the unsupported length of the tube section, and hence its sag or displacement due to gravity shock or vibration.

*Example*

I. Charging section:
   Charging section 1 square foot area
   Plate electrodes 3" centers
   Discharge electrodes 5 and 10 mil wire one per duct
   Power:
      Applied voltage 40 kv. using pulsations of short duration
      Polarity of discharge wires—negative
      Percentage removal—60 per cent
II. Collecting section:
   Number of collecting tubes 68
   Size of tubes 1½" diam. 4' long
   Precipitation electrodes ⅓ diameter of collecting tubes
   Power:
      Applied voltage 20 kv.—pulsating of short duration
      Percentage removal—99.5 (+) per cent
III. Suspended material:
   Oil mist having a concentration of 3 to 4 milligrams per cubic foot
   Volume treated—2000 C. F. M.
   Pressure drop 1.5" H2O It will be apparent that the embodiments shown are only exemplary and that various modifications can be made in construction and arrangement within the scope of our invention as defined in the appended claims.

We claim:

1. In an electrostatic precipitator comprising a plurality of tubular collecting electrodes, and support means for complementary precipitating electrodes adjacent the end of the collecting electrodes; non-discharge precipitating electrodes extending coaxially through each of said tubular collecting electrodes, each said non-discharge precipitating electrode comprising a central section of substantial non-sparking surface area extending through the middle portion of the collecting electrodes, cantilever end members of substantially smaller cross-section than the tubular central section extending from the ends of said central section through and out of the end portions of the collecting electrodes, and members connecting said end members to said supporting structures.

2. A device as claimed in claim 1, wherein the area of the tubular non-discharge precipitating electrodes is not less than ⅓ the area of the opposed collecting electrodes.

3. An electrical precipitator comprising a plurality of closely nested tubular collecting electrodes providing parallel paths for gas flow, a complementary nondischarge precipitating electrode concentrically disposed in each tubular collecting electrode and extending coaxially therethrough and beyond the ends thereof, insulated rigid conductive supporting means for the ends of said precipitating electrodes spaced from the ends of said collecting electrodes, the central portion of each precipitating electrode having a surface whose minimum radius of curvature is sufficiently large relative to its spacing from the collecting surface to prevent electric discharge, and the end portions of each precipitator electrode adjacent the ends of the respective complementary collecting electrodes having a reduced cross-section of rigid conductive material whereby the spacing between the surface of the reduced portion and the collecting electrode is increased to minimize discharge near the ends of the collecting electrodes, and a rigid cantilever connection between said end portions and said supporting means.

4. A device as claimed in claim 3, the respective ends of the collecting electrode tubes being flared outwardly.

5. A device as claimed in claim 4, said outwardly flared ends being smoothly joined to present a hexagonal configuration of sharp edges at each end of the array of nested collecting electrodes, whereby to minimize turbulence and resistance to gas flow.

6. A device as claimed in claim 5, each said supporting means being substantially strip-shaped and presenting its narrow edge to the gas stream to minimize interference with gas flow.

7. A device as claimed in claim 6, the end portion of each said precipitating electrode being streamlined at its cantilever connection with its supporting means.

8. A device as claimed in claim 7, the central portion of each said precipitating electrode being a cylindrical tube and the reduced end portions being solid in cross-section.

9. A device as claimed in claim 8, said tubular electrodes being horizontally disposed.

10. In combination, a low-ozone precipitator comprising a discharge section and a precipitator section; said charging section comprising a series of parallel flat plates lying with their planes in the direction of gas flow to provide a parallel array of ducts, intermediate fine-wire discharge electrodes between said plates extending in a direction transversely of the gas flow; and a precipitator section downstream of said discharge section, said precipitator section comprising an array of parallel nested tubular collecting electrodes with flared, joined ends, a concentric non-discharging precipitating electrode in each collecting electrode, of substantial main cross-section area, the opposed surfaces of the respective electrodes being substantially parallel to each other, a cantilever end for each said precipitating electrode of substantially smaller cross-section than the main central portion thereof, and insulated support means for said cantilever portions.

References Cited in the file of this patent

UNITED STATES PATENTS

| 1,343,285 | Schmidt | June 15, 1920 |
| 1,848,579 | Siep | Mar. 8, 1932 |
| 2,422,564 | Pegg | June 17, 1947 |
| 2,592,508 | Phyl | Apr. 8, 1952 |

FOREIGN PATENTS

| 413,800 | Great Britain | July 26, 1934 |